US012436296B2

(12) United States Patent
Carrie et al.

(10) Patent No.: US 12,436,296 B2
(45) Date of Patent: Oct. 7, 2025

(54) CLOUD-OFFLOADED GNSS POSITIONING METHOD

(71) Applicant: SYNTONY, Toulouse (FR)

(72) Inventors: Guillaume Carrie, Saint-Lys (FR); Cyrille Gernot, Ste Foy de Peyrolieres (FR); Sylvain Daubas, Montauban (FR)

(73) Assignee: SYNTONY, Toulouse (FR)

( * ) Notice: Subject to any disclaimer, the term of this patent is extended or adjusted under 35 U.S.C. 154(b) by 417 days.

(21) Appl. No.: 18/000,147

(22) PCT Filed: May 28, 2021

(86) PCT No.: PCT/FR2021/050974
§ 371 (c)(1),
(2) Date: Nov. 29, 2022

(87) PCT Pub. No.: WO2021/240119
PCT Pub. Date: Dec. 2, 2021

(65) Prior Publication Data
US 2023/0204794 A1 Jun. 29, 2023

(30) Foreign Application Priority Data
May 29, 2020 (FR) ..................................... 2005726

(51) Int. Cl.
*G01S 19/39* (2010.01)
*G01S 19/43* (2010.01)
(52) U.S. Cl.
CPC ............ *G01S 19/396* (2019.08); *G01S 19/43* (2013.01)

(58) Field of Classification Search
CPC ............................... G01S 19/396; G01S 19/43
See application file for complete search history.

(56) References Cited

U.S. PATENT DOCUMENTS

| 2007/0139264 A1* | 6/2007 | Kangas | ................... G01S 19/42 342/357.46 |
| 2010/0302099 A1* | 12/2010 | Grossnickle | ............ G01S 19/42 342/357.46 |

(Continued)

OTHER PUBLICATIONS

International Search Report for issued in Application No. PCT/FR2021/050974 dated Sep. 29, 2021.

(Continued)

*Primary Examiner* — Anil K Bhargava
(74) *Attorney, Agent, or Firm* — McDonald Hopkins LLC (57) ABSTRACT

A cloud-offloaded GNSS (CO-GNSS) positioning method for locating a connected object. The signal received by the object is translated to an intermediate frequency before being sampled. The connected object acquires the satellites and estimates the code phases, which are transmitted to the server and then time-stamped. The server then determines a set of candidate points of a mesh network seeing the same set of satellites at the time-stamping instant of the packet, and then calculates for each candidate point and each possible transmission time the differences in pseudorange between the satellites and this point. It deduces from same a likelihood metric as a function of the difference between the differences in pseudorange corresponding to the code phases estimated for the object and those calculated for each candidate point. The candidate point maximising the likelihood metric provides a rough estimate of the position of the connected object.

18 Claims, 5 Drawing Sheets

(56) References Cited

U.S. PATENT DOCUMENTS

2015/0061934 A1* 3/2015 Liu .................. G01S 19/30
    342/357.69
2018/0210090 A1* 7/2018 Soualle ............ G01S 19/396

OTHER PUBLICATIONS

Written Opinion for PCT/FR2021/050974 dated Sep. 29, 2021.
Liu, Jie, et al., "Energy Efficient GPS Sensing with Cloud Offloading", SenSys '12, Nov. 6-9, 2012, Toronto, ON, Canada.

* cited by examiner

CLOUD-OFFLOADED GNSS POSITIONING METHOD

This is the National Stage of PCT international application PCT/FR2021/050974, filed on May 28, 2021 entitled "CLOUD-OFFLOADED GNSS POSITIONING METHOD", which claims the priority of French Patent Application No. 2004854 filed May 15, 2020, both of which are incorporated herein by reference in their entireties.

TECHNICAL FIELD

The present invention relates generally to the field of positioning by satellites or GNSS (Geolocation and Navigation by Satellite System) and more particularly to a cloud-offloaded GNSS positioning method. It particularly applies in the field of the Internet of Things (IoT) for the positioning of connected objects.

PRIOR ART

The position of a connected object in an IoT network can be determined by different methods known from the prior art.

Some positioning methods involve antennas of the IoT network, namely, as the case may be, antennas proprietary to the IoT service provider (SigFox, LoRa) or else antennas of base stations of the cellular network (NB-IoT). The position of the connected object is then determined by triangulation on the basis of the distances of the object to a plurality (at least 3) of antennas. However, the obtained position is not very accurate since the distances are estimated on the basis of power measurements (RSSI) of a signal emitted by the object and received by the considered antennas, which measurements may be unavailable (insufficient coverage of the network) or affected by errors (multipath or masking, in particular in an urban environment).

Alternatively, the position of the object can be obtained in a conventional manner by equipping it with a satellite positioning system (GPS, Galileo, GLONASS), hereinafter generically designated as GNSS.

Nonetheless, these systems are complex and require large computational resources. Furthermore, the integration of a GNSS chip within a connected object cannot generally be considered because of its high energy consumption. An episodic activation of the GNSS positioning system to reduce its consumption would moreover be suboptimal and even inoperative. Indeed, a GNSS receiver generally needs several minutes to acquire the navigation data (Almanac and ephemerid data) of the different satellites when it performs a cold start-up (i.e. without any a priori information). The time necessary to obtain the position of the object without a priori information is designated TTFF (Time To First Fix). When the GNNS system has already performed the acquisition of the satellites and has their Almanac data (warm start-up), the time necessary to obtain the position of the object may be reduced to a few tens of seconds (30 s for a GPS system). Finally, when the GNSS system already has ephemerid data of the satellites and a good estimate of the satellite time (hot start-up), the time necessary to obtain the position of the object may be in the range of a few seconds.

Various solutions have been proposed in the prior art for distributing a portion of the processing performed by a GNSS receiver between the connected object and a remote server located in the cloud. Thus, it is known to reduce the portion of the GNSS receiver hosted by the connected object, to a simple stage of translation in an intermediate frequency (IF) followed by a sampling module. Packets of samples thus obtained (raw data) are then time-stamped and transmitted to a remote server which performs the rest of the processing. In other words, the GNSS positioning is cloud-offloaded.

These GNSS positioning systems distributed between the object and the cloud are generally called "snapshot GNSS receivers" or "Cloud-Offloaded GNSS receivers" in the literature.

A description of such a distributed receiver (CO-GPS) will be found in the article of J. Liu et al. entitled "Energy efficient GPS sensing with Cloud offloading" published in Proc. of 10th ACM Conference on Embedded Networked Sensor Systems (SenSys 2012), November 2012.

However, the cloud-offloaded positioning method described therein requires a time-stamping of the raw sequences transmitted by the connected object, for example by means of a clock signal emitted by a WWVB base station, which complicates the portion of the GNSS receiver hosted by the object. Furthermore, the elimination of ambiguity on the position of the object requires a calculation of the Doppler shifts due to the relative speeds of the object relative to the satellites, which assumes that the object is immobile with respect to a terrestrial reference frame.

Consequently, the object of the present invention is to propose a cloud-offloaded GNSS positioning method which does not require time-stamping by the portion of the receiver hosted by the object and which can be applied indifferently to mobile and non-mobile objects.

DISCLOSURE OF THE INVENTION

The present invention is defined, in a first embodiment, by a method for positioning a connected object, the object receiving GNSS signals from a plurality of satellites belonging to at least one satellite system and translating them in an intermediate frequency before sampling them, wherein:

(a) the object performs, on the basis of a sequence of the samples thus obtained, an acquisition of a set S of satellites seen from the connected object, then estimates code phases of the GNSS signals, the code phases being afterwards transmitted to a computing server via a communication network, said method being specific in that:

(b) the code phases are time-stamped by means of a time-stamp clock by a node of the network;

(c) the computing server determines, from among the points of a mesh network in an area of interest, a set of candidate points seeing the satellites of the set S at the time-stamping time;

(d) the server calculates the pseudoranges separating the candidate points and the satellites of S for a plurality of possible transmission times and deduces therefrom differences in pseudoranges with respect to said reference satellite;

(e) the server estimates pseudoranges separating the connected object and the satellites of S from the received code phases, estimated in step (a), and deduces therefrom the differences in pseudoranges estimated with respect to the reference satellite, then calculates an objective function dependent on the discrepancy between the differences in pseudoranges thus estimated and the pseudoranges calculated in step (d), the discrepancy being summed over all of the satellites of the set S except for the reference satellite, the calculation being carried out for each candidate point;

(f) the candidate point optimising the objective function provides an estimate of the position of the connected object.

Advantageously, the code phases are time-stamped in step (b) by a gateway linked to the access point of the network receiving said code phases or by the computing server.

The invention is also defined, in a second embodiment, by a method for positioning a connected object, the object receiving GNSS signals from a plurality of satellites belonging to at least one satellite system and translating them in an intermediate frequency before sampling them, at least one packet of samples thus obtained being transmitted to a computing server via a communication network, said method being specific in that:

(a) the packet of samples is time-stamped by means of a time-stamp clock by a node of the network;
(b) the computing server performs, on the basis of said packet, an acquisition of a set S of satellites seen from the connected object, then estimates code phases of the GNSS signals and deduces therefrom the differences in pseudoranges separating the connected object and said satellites, the differences being estimated with respect to a reference satellite of the set S;
(c) the computing server determines, from among the points of a mesh network in an area of interest, a set of candidate points seeing the satellites of the set S at the time-stamping time;
(d) the server calculates the pseudoranges separating the candidate points and the satellites of S for a plurality of possible transmission times and deduces therefrom differences in pseudoranges with respect to said reference satellite;
(e) the server calculates an objective function dependent on the discrepancy between the differences in pseudoranges estimated in step (b) and the differences in pseudoranges calculated in step (d), the discrepancy being summed over all of the satellites of the set S except for the reference satellite, the calculation being carried out for each candidate point;
(f) the candidate point optimising the objective function provides an estimate of the position of the connected object.

Advantageously, the packet of samples is time-stamped in step (a) by a gateway linked to the access point of the network receiving said packet or by the computing server.

In particular, the time-stamp clock may be synchronised by the NTP protocol.

Regardless of the embodiment, the differences between pseudoranges calculated in step (d) are calculated modulo cT where c is the speed of light and T the repetition period of a spread code in the GNSS signals.

In step (c), the dimensions of the mesh of the network are preferably selected so as to be strictly smaller than cT.

In step (c), the server can determine the positions of the satellites of the set S at the time-stamping time on the basis of Almanac information or ephemerids received by the network, and deduces therefrom the candidate points of the area of interest seeing the satellites of said set.

Typically, the possible transmission times are times of transmission of codes by the satellites of S within an interval $[\hat{t}_E - \Delta t_E, \hat{t}_E + \Delta t_E]$ with $\hat{t}_E = \hat{t}_R - \theta$ where $\hat{t}_R$ is the time-stamping time, $\theta$ is an average propagation time between the satellites of S and the candidate points, and $\Delta t_E$ is a predetermined error margin.

This error margin may be selected so as to be greater than the maximum offset of the time-stamp clock with respect to the clock of the satellite system.

According to an advantageous variant, in step (e), the server determines whether a quality criterion is met by comparing an extreme value of the objective function with a predetermined threshold value and, when the quality criterion is not met, a new sequence of steps (c), (d), (e) is performed by eliminating a satellite from the set S.

The objective function may be a likelihood metric and the optimum candidate point may then be defined by the index $i_{ML}$ of the candidate point from among the set of the candidate points $P_i$, i=0, . . . , N−1, given by:

$$i_{ML}, j_{ML} = \arg\max_{i,j} \left( \sum_{k=1}^{K-1} \frac{1}{c} |(\rho_{k,i}^j - \rho_{0,i}^j) \bmod. T + (\tau_k - \tau_0) \bmod. T|^2 \right)^{-1}$$

where $(\rho_{k,i}^j - \rho_{0,i}^j)$ is the difference in the pseudoranges separating, at the possible transmission time $t_E^j$, the candidate point $P_i$ and the satellite $s_k$ of the set S, T is the repetition period of a spread code in the GNSS signals, $(\tau_k - \tau_0)$ is the difference in phases of the code of the satellite $s_k$ and of the reference satellite $s_0$, c is the speed of light and K is the number of satellites of the set S.

BRIEF DESCRIPTION OF THE DRAWINGS

Other features and advantages of the invention will appear upon reading a preferred embodiment of the invention, described with reference to the appended figures wherein.

DETAILED DISCLOSURE OF PARTICULAR EMBODIMENTS

Figure 1A:
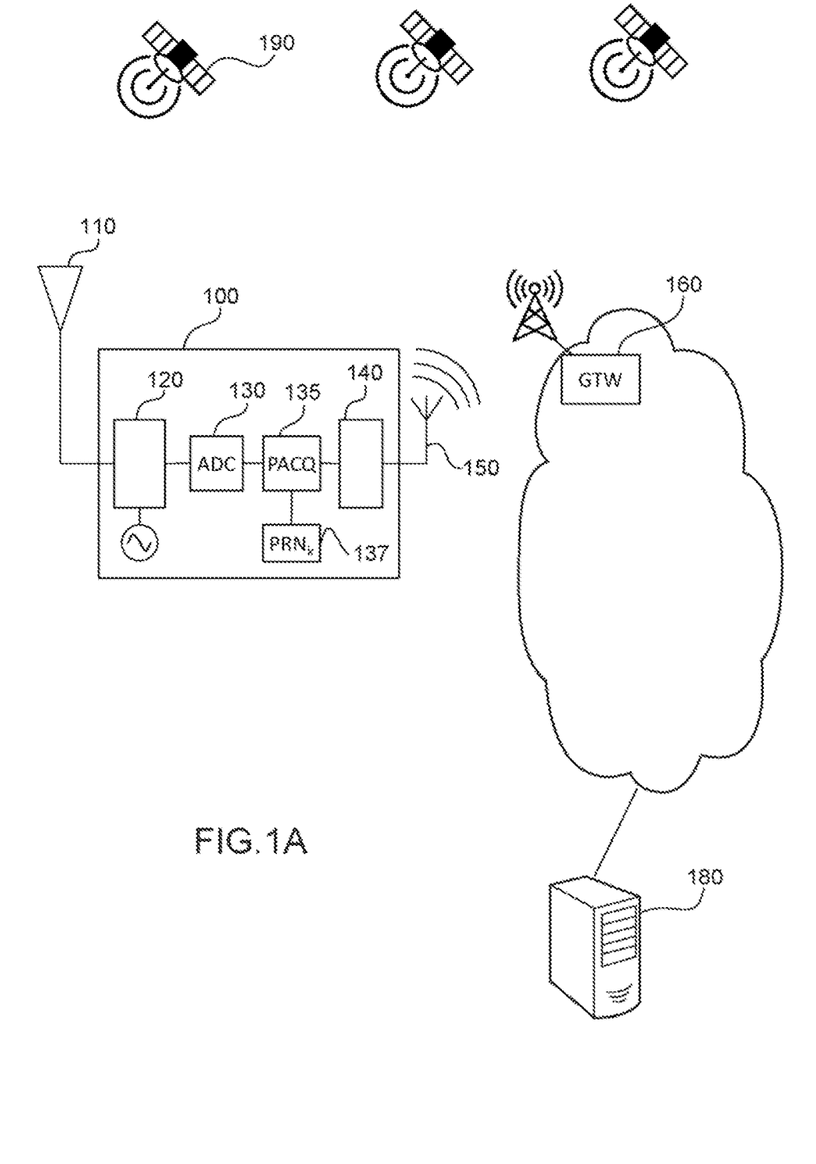
FIG. 1A schematically represents the architecture of a CO-GNSS system capable of implementing the positioning method according to a first embodiment of the invention.

FIG. 1A represents a generic architecture wherein the CO-GNSSS positioning method according to a first embodiment of the invention can be implemented.

The connected object 100 is equipped with a first RF antenna 110, capable of receiving GNSS signals emitted by satellites 190, for example one or more satellite system(s) such as GPS, Galileo, Glonass, Beidou, etc.

For illustration and without loss of generality, unless explicitly indicated otherwise, we will assume in the following that the GNSS signals are signals emitted by GPS satellites.

It should be recalled that the L1 C/A GNSS signals of GPS satellites are RF signals emitted on a frequency carrier L1 (1,575.42 MHz). The satellites transmit their GNSS signals simultaneously and continuously, each satellite transmitting, with a rate of 50 bits/s, data packets providing in particular the orbit parameters (Almanac and ephemerid data) of the considered satellite. The GNSS signals of the different satellites are multiplexed by codes (CDMA), each satellite is provided with its own spread code (or sequence) with a length of 1,023 bits (or chips). In other words, each bit emitted by a satellite, $SV_k$, is modulated by the spread sequence specific to the latter, $PRN_k$, the latter being repeated with a period much shorter (1/20) than the duration of a bit.

The RF signal received by the antenna 110 is translated in an intermediate frequency (IF) by the frequency mixer 120 before being sampled in 130 at a frequency higher than or equal to the Nyquist frequency to obtain a sequence of samples.

An acquisition of the different satellites is carried out in 135, the code phases relating to the different satellites being obtained by sliding correlation with local replicas of the respective codes of these satellites stored in 137. In the following, the set of the acquired satellites is denoted as S.

More specifically, in order to take account, on the one hand, of the Doppler frequency shift due to the relative speed of the object relative to each satellite and, on the other hand, of the frequency shift due to the drift of the local clock, a packet of samples is first subjected to an FFT and the signal in each frequency band (frequency bin), then is subjected to a multiplication with the conjugate of the FFT of the local replica, the result thus obtained being finally subjected to an inverse FFT. This operation is equivalent to a sliding correlation with a local replica of the code of each satellite of the constellation, shifted at the frequency of the considered band.

Thus, the module 135 performs, on the basis of the packet of samples, the acquisition of the set S of the satellites seen by the connected object. It should be noted that other acquisition methods, known per se, may be used without departing from the scope of the present invention.

Thus, for each of the satellites $SV_k$, k=0, . . . , K−1, of the set S, it determines "the phase of the code" present in the received signal, i.e. the start of the corresponding codes in the sequence of samples, corresponding to the maximum of the aforementioned sliding correlation.

The code phases thus obtained for the different satellites are transmitted by an IoT emission module (LoRa, SigFox, NB-5G), 140, via a second antenna 150 to an access point (base station, proprietary node), equipped with a gateway 160 which routes them afterwards through the Internet network to a computing server, 180.

Advantageously, the gateway 160 is provided with a time-stamping module (not represented) which concatenates a time-stamp token (timestamp) to the code phases upon reception thereof before forwarding them to the server. For example, the time-stamping module may be synchronised with the network by means of an NTP (Network Time Protocol) protocol.

Alternatively, the code phases may be time-stamped by the computing server, in other words may be allocated a reception time, the computing server advantageously being synchronised with the network by means of the NTP protocol.

It is important to note that the connected object does not itself perform the time-stamping. Indeed, such a time-stamping would assume that a local clock is available having a low drift with respect to the GPS clock, which would be hardly compatible with setting the object on standby or would increase its consumption in this mode.

The code phases, time-stamped by the gateway or by the computing server, are processed afterwards by the latter to estimate the position of the connected object, as detailed later on.

Figure 1B:
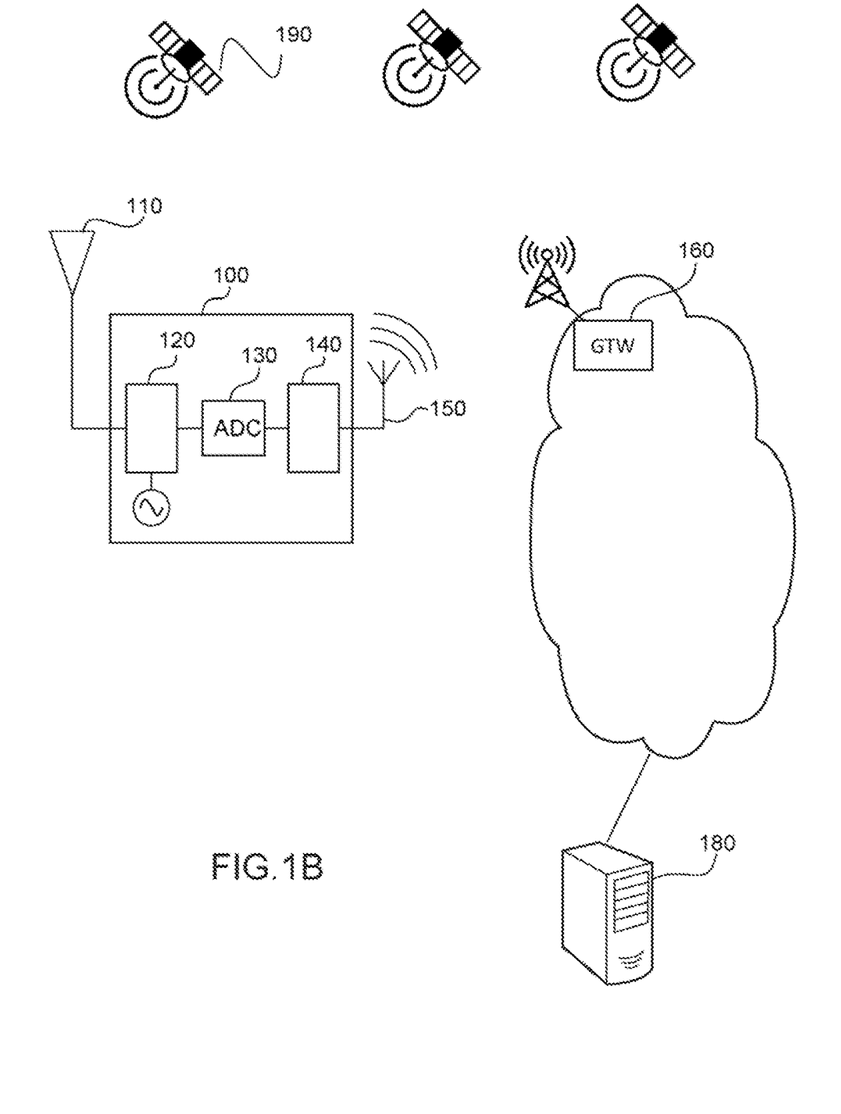
FIG. 1B schematically represents the architecture of a CO-GNSS system capable of implementing the positioning method according to a second embodiment of the invention.

FIG. 1B represents a generic architecture wherein the CO-GNSS positioning method according to a first embodiment of the invention can be implemented.

The elements bearing the same reference signs as those of FIG. 1A have the same meaning.

Like in the first embodiment, the RF signal received by the antenna 110 is translated in an intermediate frequency by the frequency mixer 120 before being sampled in 130 to obtain a sequence of samples. A packet of samples is stored in a buffer (not represented) and then sent via the IoT emission module, 140, and the second antenna, 150, to the access point equipped with the gateway 160 which routes it via the Internet to the computing server.

The packet of received samples (raw data) is time-stamped by the gateway or by the computing server, like in the first embodiment. Nonetheless, unlike the first embodiment, it is the packet of samples itself and not the code phases which is herein transmitted to the server after having been time-stamped, the server then performing the acquisition and the estimation of the code phases.

The first embodiment has the advantage of requiring only the transmission of reduced information (the code phases), which is particularly suitable for an IoT network to the extent that the uplinks are generally at low bit rate. On the other hand, it requires some processing complexity at the connected object. Conversely, the second embodiment merely involves a very simple architecture of the connected object, but provides for a transmission of a larger amount of data.

The principle of the positioning method of the invention will first be disclosed hereinafter, independently of its hardware implementation.

The code of the satellite $SV_k \in S$ being repeated with a repetition period T (1 ms in the case of a GPS signal), the phase of the code, $\tau_k$, in the received signal corresponds, in time equivalent, to the emission time of the signal received by the object, namely:

$$\tau_k = [\delta_k + t_R - \rho_k/c] \bmod T \quad (1)$$

where $\delta_k$ is the time offset of the clock of the satellite $SV_k$ with respect to the time of the GPS system, and $t_R$ is the local time of the object (GPS time affected with the clock error of the object) corresponding to the reception of the first sample of the packet, $\rho_k$ is the pseudorange of the object connected to the satellite. Indeed, the pseudorange $\rho_k$ is conventionally defined by:

$$\rho_k = c(t_R - t_k) \quad (3)$$

where $t_k$ is the emission time, measured with respect to the time of the GPS system, and $\tau_k = t_k + \delta_k$.

After having received the code phases (first embodiment) or estimated them by itself (second embodiment), the computing server selects a reference satellite in the set S, namely conventionally $SV_0$, and determines the code phase differences between each of the other satellites and $SV_0$, in other words, since the codes of the different satellites are received at the same time $t_R$:

$$\tau_k - \tau_0 = [(\delta_k - \delta_0) - (\rho_k - \rho_0)/c] \bmod T \quad (3)$$

Subject to the correction of the clock offsets $\delta_k$, $\delta_0$ on the basis of the ephemerid data, the server can simply calculate the difference in the code phases of the satellites $SV_k$ and $SV_0$:

$$\tau_k - \tau_0 = [-(\rho_k - \rho_0)/c] \mod T \quad (4)$$

It is important to note that the difference in code phases or, in an equivalent manner, the difference in pseudoranges between the satellites allows doing without the time of reception of the GNSS signal by the connected object (and therefore in particular with the clock error of the object).

Afterwards, the computing server performs a meshing of the area of interest with a network of points, R, this area of interest depending on the a priori knowledge available to the server with regards to the position of the object. The area of interest may be three-dimensional, two-dimensional and possibly one-dimensional. For example, the area of interest may be defined by a volume comprised between two predetermined altitudes all around the terrestrial globe, an area at the surface of the terrestrial globe comprised between two latitudes and two longitudes, or a section of an overland road.

The meshing of the area is selected so as to be dense enough so that any point of the area of interest is at a distance smaller, and possibly substantially smaller, than $cT/2$ from a point belonging to the network R. For a two-dimensional area, it is possible in particular to select a square mesh with a side with a length smaller, and possibly substantially smaller, than $cT$.

In order to obtain a denser mesh of the area of interest, the server may acquire satellites of different GNSS systems (GPS, Galileo, etc.) having different code periodicities.

Afterwards, the server determines the points of the network of points R seeing at least the satellites of the set S at the time $\hat{t}_R$, estimation of the reception time $t_R$. The estimate $\hat{t}_R$ is provided by the time-stamp token of the packet of samples, whether the time-stamping is performed by the gateway 160, $\hat{t}_R^{GTW}$, or by the server 180 itself, $\hat{t}_R^S$. This estimate is approximate to the extent that it does not take account of the time of transmission from the connected object to the gateway, increased in the case of $\hat{t}_R^S$, by the time to forward to the server through the network. Furthermore, this estimate also does not take account of the offset of the time-stamp clock (a few ms and possibly a few tens of ms) with respect to the GPS clock. Nonetheless, given the angular scrolling speed of the satellites (in the range of a hundredth of a degree per second), the accuracy of this estimate is very much sufficient to assume that the satellite configuration is identical.

Given $\hat{t}_R$ as well as the Almanac or preferably ephemerid data received by the network, the server can estimate the positions of the different satellites. For example, it can retain only those having an elevation greater than a predetermined threshold value, for example 5°, for each candidate point of the network of points R.

The points of R seeing all of the satellites of the set S at the time $\hat{t}_R$ form a set $C = \{P_i \in R, i=0, \ldots, N-1\}$ of candidate points for the position of the connected object.

Afterwards, the server estimates on the basis of $\hat{t}_R$, the possible times of transmission of codes by the different satellites of S. These times are selected in a range $[\hat{t}_E - \Delta t_E, \hat{t}_E + \Delta t_E]$ with $\hat{t}_E = \hat{t}_R - \theta$ where $\theta$ is an average propagation time of the signals emitted by the satellites of S and the candidate points. The error margin, $\Delta t_E$, takes account in particular of the uncertainty regarding the estimation of the reception time $t_R$ and of other random errors (error regarding the propagation time between the connected object and the server or regarding the parameters of the tropospheric model for example). The possible code transmission times are denoted hereinafter as $t_E^j = t_R^j - \theta$, $j=0, \ldots, M-1$.

Afterwards, the server assesses an error metric at each point in the set C.

More specifically, it calculates for each candidate point $P_i$, $i=0, \ldots, N-1$, of C, and for each possible transmission time $t_E^j$, $j=0, \ldots, M-1$ the $K-1$ differences in pseudoranges modulo T, i.e. $(\rho_{k,i}^j - \rho_{0,i}^j) \mod T$, where $\rho_{k,i}^j$ designates the pseudorange calculated between the position of the satellite $SV_k$ at the time $t_E^j$ and the candidate point $P_i$.

Afterwards, the server selects the candidate point and the possible transmission time by means of:

$$i_{ML}, j_{ML} = \arg\min_{i,j} \left( \sum_{k=1}^{K-1} \left| [(\rho_{k,i}^j - \rho_{0,i}^j)/c] \mod T + [\tau_k - \tau_0] \mod T \right|^2 \right) \quad (5)$$

Consequently, the most likely emission time $t_E^{j_{ML}}$ and position $P_{i_{ML}}$ are deduced therefrom. In general, the argument to be minimised of the expression (5) may be of the type $$F\left( \sum_{k=1}^{K-1} \left| [(\rho_{k,i}^j - \rho_{0,i}^j)/c] \mod T + [\tau_k - \tau_0] \mod T \right|^2 \right)$$

where F is an increasing function.

Alternatively, the server may select the candidate point and the possible transmission time by means of a likelihood metric:

$$i_{ML}, j_{ML} = \arg\max_{i,j} \left( \sum_{k=1}^{K-1} \left| [(\rho_{k,i}^j - \rho_{0,i}^j)/c] \mod T + [\tau_k - \tau_0] \mod T \right|^2 \right)^{-1} \quad (6)$$

Like before, the most likely emission time $t_E^{j_{ML}}$ and position $P_{i_{ML}}$ are obtained. In general, the argument to be maximised of the expression (6) may be $$G\left( \sum_{k=1}^{K-1} \left| [(\rho_{k,i}^j - \rho_{0,i}^j)/c] \mod T + [\tau_k - \tau_0] \mod T \right|^2 \right)$$

where G is a decreasing function. This variant will be preferred in order to allow highlighting the peak corresponding to the maximum likelihood more easily from the noise.

More generally, the server will seek to optimise an objective function in order to select from among the possible emission times and the candidate points, those that correspond to the maximum likelihood. Objective functions other than those by the expressions (5) and (6) may be considered by a person skilled in the art without departing from the scope of the present invention.

According to one variant, the discrepancies $$\left| \frac{1}{c}(\rho_{k,i}^j - \rho_{0,i}^j) \mod T + (\tau_k - \tau_0) \mod T \right|^2$$

are weighted by the signal-to-noise ratio (at the output of the sliding correlator) affecting the measurement of the phase code $\tau_k$. Thus, the least noisy measurements bring in a stronger contribution to the objective function. Thus, it is possible for example to opt for:

$$j_{ML} = \arg\min_{i,j} \left( \sum_{k=1}^{K-1} \lambda_k \log \left| [(\rho_{k,i}^j - \rho_{0,i}^j)/c] \bmod. T + [\tau_k - \tau_0] \bmod. T \right| \right) \quad (7)$$

$i_{ML}$, where $\lambda_k$ the signal-to-noise ratio affecting the measurement of the code phase $\tau_k$.

It should be noted that the arguments of the objective functions in the expressions (5)-(7) are temporal arguments, namely temporal equivalents of differences in pseudoranges. In an equivalent manner, it is clear that these arguments can, by simple multiplication by c, relate to the differences in pseudoranges themselves.

Figure 2:
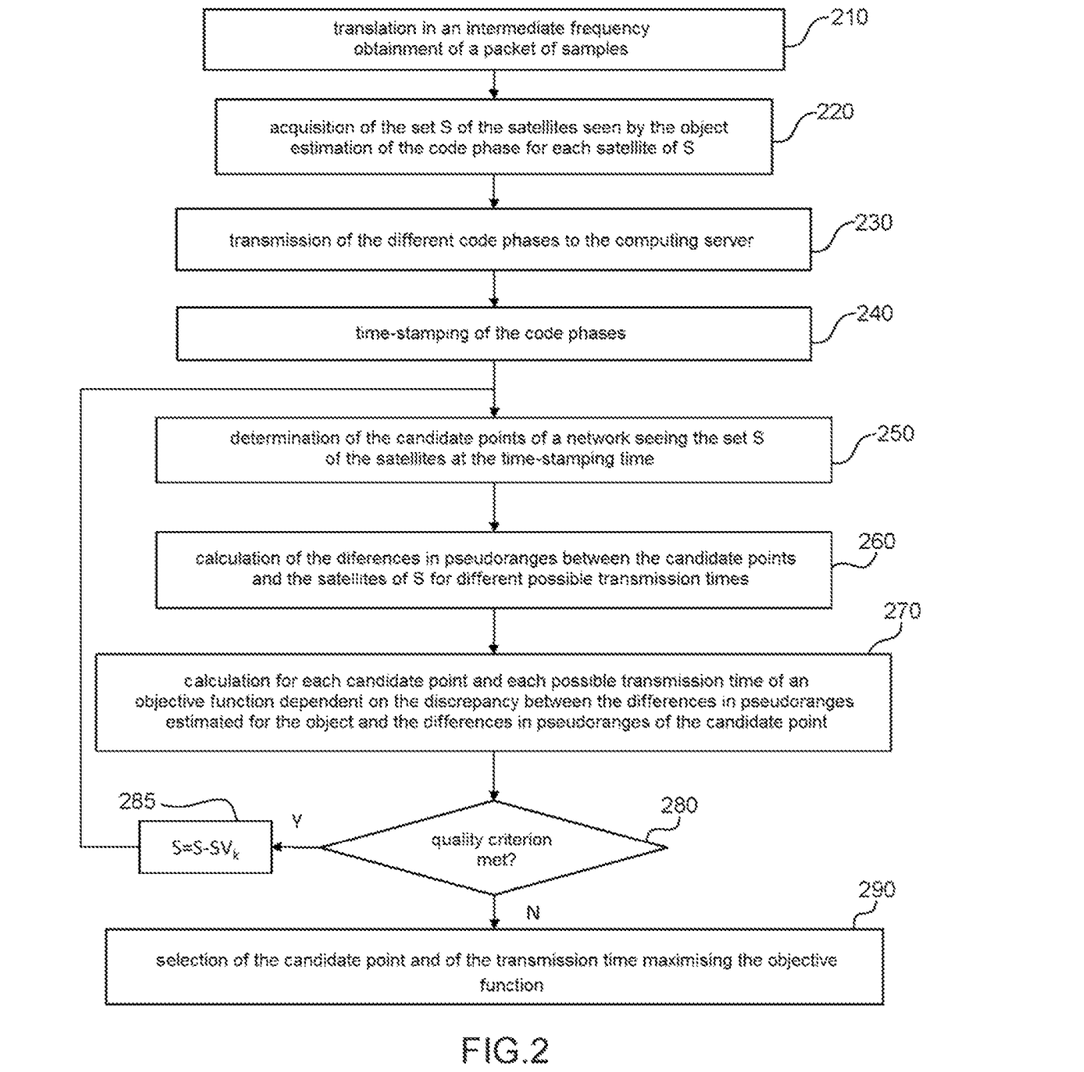
FIG. 2 schematically represents the flowchart of a CO-GNSS positioning method according to the first embodiment of the invention.

FIG. 2 schematically represents the flowchart of a CO-GNSS method for positioning a connected object according to the first embodiment of the invention.

In step 210, the GNSS signal received by the main lobe of the first antenna is translated at an intermediate frequency before being sampled at least at the Nyquist frequency. Thus, the connected object obtains a sequence of raw samples (raw data).

In step 220, the connected object carries out afterwards the acquisition of the different satellites and estimates the code phase for each of them. The acquisition may be carried out by means of a sliding correlation, transposed into the frequency domain, as indicated hereinabove.

Afterwards, the code phases thus obtained for the different satellites of S are transmitted to the computing server in 230 and are time-stamped in 240 by a node on the routing path between the gateway and the server. By time-stamping, it should be herein understood any method allowing adding a reception date to the code phases. The time-stamp clock is synchronised by means of the network, for example by means of the NTP protocol.

In step 250, the server uses a meshing of the area of interest by a network of points, R. The mesh of R has a size a substantially smaller than cT where T is the repetition period of the CDMA code/the duration of the spread sequence. Afterwards, it determines the points of R within the area of interest which see at least the satellites of the set S at the time $\hat{t}_R$ provided by the time-stamp. Thus, a subset $C \subset R$ of candidate points is formed. The positions of the satellites at the time $\hat{t}_R$ are estimated from the Almanac data or, preferably, from ephemerids, obtained via the network.

In step 260, the server calculates, at each candidate point $P_i$, i=0, ..., N-1, of C and, for each possible transmission time $t_E^j$, j=0, ..., M-1, the K-1 of the differences in pseudoranges modulo cT, namely $(\rho_{k,i}^j-\rho_{0,i}^j)$mod·cT, k=1, ..., K-1, the possible transmission times being selected in an interval $[\hat{t}_E-\Delta t_E, \hat{t}_E+\Delta t_E]$ with $\hat{t}_E=\hat{t}_R-\theta$ where $\theta$ is an average propagation time between the satellites of S and the points of C.

In step 270, the server calculates for each candidate point and each possible transmission time, a discrepancy between, on the one hand, the differences in the pseudoranges associated with the code phases estimated in step 220, namely $[c(\tau_k-\tau_0)]$mod·cT, k=1, ..., K-1 and, on the other hand, the differences in pseudoranges in time equivalent calculated in step 260, this discrepancy being summed up over the set S of the satellites other than the reference satellite. For example, this objective function may be a likelihood metric to be maximised or an error metric to be minimised. Of course, this discrepancy may be calculated in an indifferent manner in time or in distance, as indicated hereinabove.

It should be noted that when the positioning method is multi-constellation, the discrepancies of differences in pseudoranges are summed over all of the sets of satellites, $S_1, S_2, \ldots$ corresponding to the different constellations. The method can take into account constellations having different repetition periods to the extent that the discrepancies are calculated satellite-by-satellite.

On the basis of the discrepancy thus determined for each candidate point, the server deduces therefrom the value taken by the objective function at each of the considered points.

In step 280, the server tests whether a quality criterion is met.

The quality criterion will be considered to be met if the maximum of the objective function (alternatively the minimum of the cost function) over all of the candidate points is higher (i.e. lower than) a predetermined threshold value.

For example, if the objective function defined by (6) is used, the quality criterion will be considered to be met if:

$$\max_{i,j} \left( \sum_{k=1}^{K-1} \left| [(\rho_{k,i}^j - \rho_{0,i}^j)/c] \bmod. T + [\tau_k - \tau_0] \bmod. T \right|^2 \right)^{-1} > \frac{2\mu}{(K-1)a^2} \quad (8)$$

where $\mu$ is an adjustment coefficient (generally close to 1) which is all the more as a high level of quality is desired. It should be understood for example that if $\mu=1$, the quality criterion means that the discrepancies between the estimated differences in pseudoranges and those calculated are on average less than the half-length ($a/\sqrt{2}$) of the diagonal of the mesh over the set S of the satellites in question.

When the quality criterion is met, we continue in 290. Conversely, the value of K is decremented by 1, and a satellite $SV_k$ of the set S is arbitrarily excluded. Afterwards, we return in 250 to a new determination of the candidate points on the basis of the reduced set $S\setminus\{SV_k\}$. Each of the satellites of the set S is eliminated in turn, which amounts to successively testing the subsets with a cardinal K-1 of this set. If none of these subsets allows meeting the aforementioned quality criterion, the search is carried on by eliminating pairs of satellites S in turn from the set $S\setminus\{SV_k, SV_{k'}\}$, then in the event of a failure to triplets of satellites, etc. This process is carried on as long as the quality criterion is not met and, as long as a predetermined minimum number of satellites is preserved (in practice 5).

It should be noted that, although preferred, step 280 remains optional.

In step 290, the server selects the candidate point and transmission time pair corresponding to the optimum of the objective function, i.e. to the least discrepancy of pseudoranges (or its time equivalent).

The selected candidate point gives a coarse estimate of the position of the connected object.

Where appropriate, this coarse estimate may be used afterwards as an initial value by a hot positioning algorithm, to provide a more accurate estimate.

Figure 3:
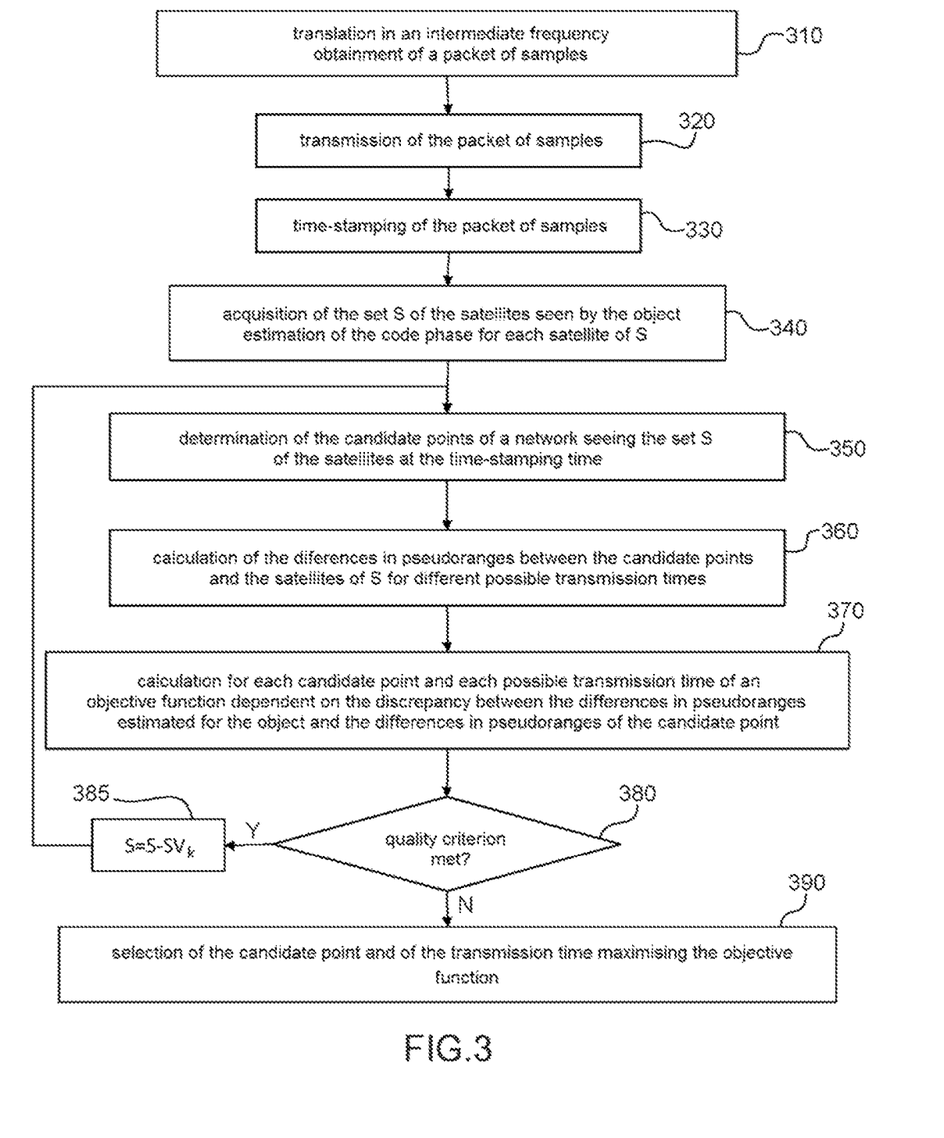
FIG. 3 schematically represents the flowchart of a CO-GNSS positioning method according to the second embodiment of the invention.

FIG. 3 schematically represents the flowchart of a CO-GNSS method for positioning a connected object according to the second embodiment of the invention.

The first step 310 is similar to step 210 of FIG. 2 to the extent that the GNSS signal received by the connected object is translated at an intermediate frequency then sampled. The connected object forms packets of samples of predetermined size and transmits them in step 320 via its transmission module IoT to the computing server.

In the remainder of the algorithm, the processing of such a packet of samples is considered.

In step 330, the packet of samples is time-stamped either by a node on the routing path between the gateway and the computing server (for example by the gateway or else by the server itself). By time-stamping, it should be herein understood any method allowing adding a reception date to the packet. The time-stamp clock is synchronised by means of the network, for example by means of the NTP protocol.

The next steps are all performed by the computing server.

In step 340, the server performs the acquisition of the set S of the satellites seen by the object. It estimates, on the basis of the sequence of samples contained in the packet, the code phases relating to the different satellites. Afterwards, it calculates the code phase differences between the different satellites and a reference satellite, as explained before.

Where appropriate, the acquisition of the satellites and the estimation of the code phases may be performed for different satellite systems (GPS, Galileo, etc.), the processing in 340 being then performed for these different systems.

The next steps 350-390 are respectively identical to steps 250-290 and therefore their description will not be repeated herein.

Figure 4:
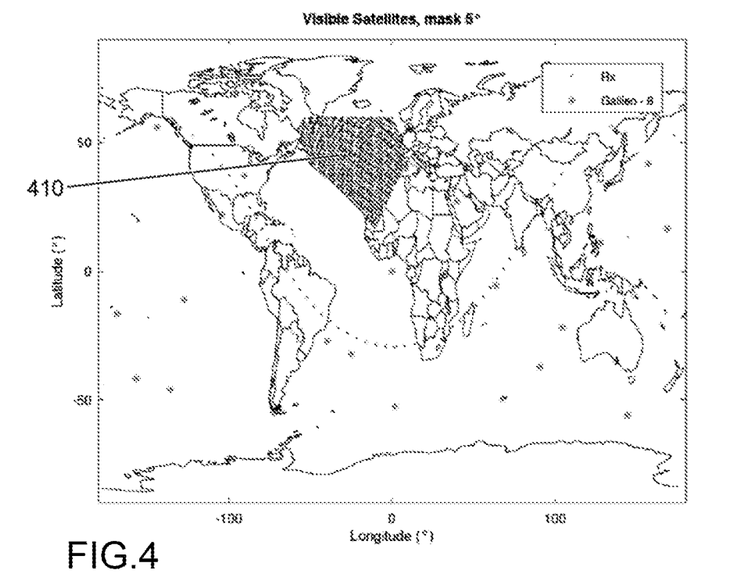
FIG. 4 represents the result of the step of determining the candidate points in the method of FIG. 2 or 3.

FIG. 4 illustrates in one example the result of the step of determining the candidate points in step 250 or 350.

The area of interest was herein the entire surface of the terrestrial globe comprised between the latitudes from −60° to +60°, the network of points R resulting from a regular mesh in latitude and longitude of this surface. The set S of the satellites seen from the connected object consisted of 8 satellites of the Galileo system.

The set C of the candidate points is designated 410. It consists of all of the points of R seeing the satellites of S, the satellites having an elevation angle on the horizon of less than 5° being excluded.

Figure 5:
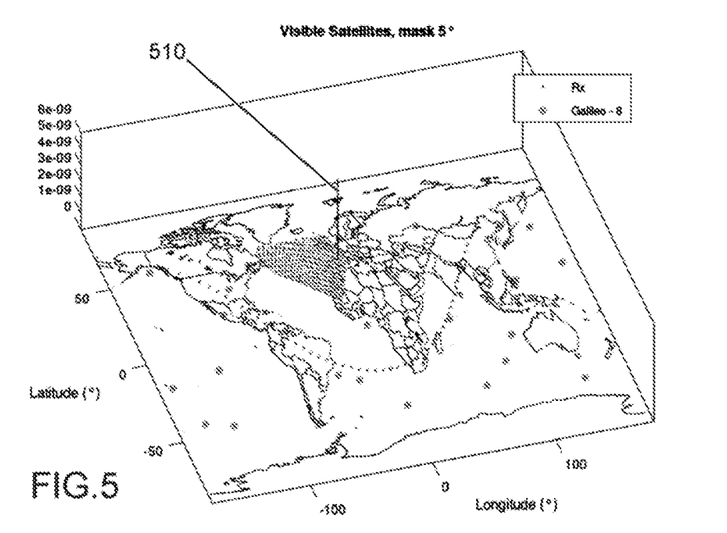
FIG. 5 represents the result of the step of selecting the candidate point according to a maximum likelihood criterion in the method of FIG. 2 or 3.

FIG. 5 shows in the example of FIG. 4 the result of the selection of the optimum candidate point in step 290 or 390. The objective function was a likelihood metric as given by the expression (6). It is noticed that this metric has a very marked peak, 510, corresponding to the position of the connected object.

What is claimed is:

1. A method for positioning a connected object, the connected object receiving Global Navigation Satellite System (GNSS) signals from a plurality of satellites belonging to at least one satellite system and translating them in an intermediate frequency before sampling them, wherein:
   (a) the connected object performs, on the basis of a sequence of the samples thus obtained, an acquisition of a set S of satellites seen from the connected object, then estimates code phases of the GNSS signals, the code phases being afterwards transmitted to a computing server via a communication network;
   (b) the code phases are time-stamped by means of a time-stamp clock by a node of the communication network;
   (c) the computing server determines, from among the points of a mesh network in an area of interest, a set of candidate points seeing the satellites of the set S at the time-stamping time;
   (d) the computing server calculates the pseudoranges separating the candidate points and the satellites of S for a plurality of possible transmission times and deduces therefrom differences in pseudoranges with respect to a reference satellite;
   (e) the computing server estimates pseudoranges separating the connected object and the satellites of S from the code phases, estimated in step (a) and transmitted by the connected object to the computing server, and deduces therefrom differences in pseudoranges estimated with respect to the reference satellite, then calculates an objective function dependent on the discrepancy between the differences in pseudoranges thus estimated and the pseudoranges calculated in step (d), the discrepancy being summed over all of the satellites of the set S except for the reference satellite, the calculation being carried out for each candidate point;
   (f) the candidate point optimising the objective function provides an estimate of the position of the connected object.

2. The method for positioning a connected object according to claim 1, wherein the code phases are time-stamped in step (b) by a gateway linked to the access point of the communication network receiving said code phases or by the computing server.

3. The method for positioning a connected object according to claim 1, wherein the time-stamp clock is synchronised by the Network Time Protocol (NTP).

4. The method for positioning a connected object according to claim 1, wherein the differences between pseudoranges calculated in step (d) are calculated modulo cT where c is the speed of light and T is the repetition period of a spread code in the GNSS signals.

5. The method for positioning a connected object according to claim 4, wherein in step (c), the dimensions of the mesh of the network are selected strictly smaller than cT.

6. The method for positioning a connected object according to claim 1, wherein, in step (c), the computing server determines the positions of the satellites of the set S at the time-stamping time on the basis of Almanac information or of ephemerids received by the communication network, and deduces therefrom the candidate points of the area of interest seeing the satellites of said set.

7. The method for positioning a connected object according to claim 1, wherein the possible transmission times are times of transmission of codes by the satellites of S within an interval $[\hat{t}_E - \Delta t_E, \hat{t}_E + \Delta t_E]$ with $\hat{t}_E = \hat{t}_R - \theta$ where $\hat{t}_R$ is the time-stamping time, $\theta$ is an average propagation time between the satellites of S and the candidate points, and $\Delta t_E$ is a predetermined error margin.

8. The method for positioning a connected object according to claim 7, wherein the error margin is selected so as to be greater than the maximum offset of the time-stamp clock with respect to the clock of the satellite system.

9. The method for positioning a connected object according to claim 1, wherein, after step (e), the computing server determines whether a quality criterion is met by comparing an extreme value of the objective function with a predetermined threshold value and in that when the quality criterion is not met, a new sequence of steps (c), (d), (e) is performed by eliminating a satellite from the set S.

10. The method for positioning a connected object according to claim 1, wherein, the objective function is a likelihood metric and in that the optimal candidate point is defined by the index $i_{ML}$ of the candidate point among the set of candidate points $P_i$, i=0, . . . , N−1, given by:

$$i_{ML}, j_{ML} = \arg\min_{i,j} \left( \sum_{k=1}^{K-1} \frac{1}{c} [(\rho_{k,i}^j - \rho_{0,i}^j)] \bmod. T + [\tau_k - \tau_0] \bmod. T \right|^2 \right)^{-1}$$

where $(\rho_{k,i}{}^j - \rho_{0,i}{}^j)$ is the difference in pseudoranges separating, at the possible transmission time $t_E{}^j$, the candidate point $P_i$ and the satellite $s_k$ of the set S, T is the repetition period of a spread code in the GNSS signals, $(\tau_k - \tau_0)$ is the difference in phases of the code of the satellite $s_k$ and of the reference satellite $s_0$, c is the speed of light and K is the number of satellites of the set S.

11. A method for positioning a connected object, the connected object receiving Global Navigation Satellite System (GNSS) signals from a plurality of satellites belonging to at least one satellite system and translating them in an intermediate frequency before sampling them, at least one packet of samples thus obtained being transmitted to a computing server via a communication network, wherein:
  (a) the packet of samples is time-stamped by means of a time-stamp clock by a node of the communication network;
  (b) the computing server performs, on the basis of said packet, an acquisition of a set S of satellites seen from the connected object, then estimates code phases of the GNSS signals and deduces therefrom differences in pseudoranges separating the connected object and said satellites, the differences being estimated with respect to a reference satellite of the set S;
  (c) the computing server determines, from among the points of a mesh network in an area of interest, a set of candidate points seeing the satellites of the set S at the time-stamping time;
  (d) the computing server calculates the pseudoranges separating the candidate points and the satellites of S for a plurality of possible transmission times and deduces therefrom differences in pseudoranges with respect to said reference satellite;
  (e) the computing server calculates an objective function dependent on the discrepancy between the differences in pseudoranges estimated in step (b) and the differences in pseudoranges calculated in step (d), the discrepancy being summed over all of the satellites of the set S except for the reference satellite, the calculation being carried out for each candidate point;
  (f) the candidate point optimising the objective function provides an estimate of the position of the connected object.

12. The method for positioning a connected object according to claim 11, wherein the packet of samples is time-stamped in step (a) by a gateway linked to the access point of the communication network receiving said packet or by the computing server.

13. The method for positioning a connected object according to claim 11, wherein the time-stamp clock is synchronised by the Network Time Protocol (NTP).

14. The method for positioning a connected object according to claim 11, wherein the differences between pseudoranges calculated in step (d) are calculated modulo cT where c is the speed of light and T is the repetition period of a spread code in the GNSS signals.

15. The method for positioning a connected object according to claim 11, wherein, in step (c), the computing server determines the positions of the satellites of the set S at the time-stamping time on the basis of Almanac information or of ephemerids received by the communication network, and deduces therefrom the candidate points of the area of interest seeing the satellites of said set.

16. The method for positioning a connected object according to claim 11, wherein the possible transmission times are times of transmission of codes by the satellites of S within an interval $[\hat{t}_E - \Delta t_E, \hat{t}_E + \Delta t_E]$ with $\hat{t}_E = \hat{t}_R - \theta$ where $\hat{t}_R$ is the time-stamping time, $\theta$ is an average propagation time between the satellites of S and the candidate points, and $\Delta t_E$ is a predetermined error margin.

17. The method for positioning a connected object according to claim 16, wherein the error margin is selected so as to be greater than the maximum offset of the time-stamp clock with respect to the clock of the satellite system.

18. The method for positioning a connected object according to claim 11, wherein, the objective function is a likelihood metric and in that the optimal candidate point is defined by the index $i_{ML}$ of the candidate point among the set of candidate points $P_i$, i=0, ..., N−1, given by:

$$i_{ML}, j_{ML} = \arg\max_{i,j} \left( \sum_{k=1}^{K-1} \frac{1}{c} |[(\rho_{k,i}^j - \rho_{0,i}^j)] \bmod. T + [\tau_k - \tau_0] \bmod. T|^2 \right)^{-1}$$

where $(\rho_{k,i}{}^j - \rho_{0,i}{}^j)$ is the difference in pseudoranges separating, at the possible transmission time $t_E{}^j$, the candidate point $P_i$ and the satellite $s_k$ of the set S, T is the repetition period of a spread code in the GNSS signals, $(\tau_k - \tau_0)$ is the difference in phases of the code of the satellite $s_k$ and of the reference satellite $s_0$, c is the speed of light and K is the number of satellites of the set S.

* * * * *